(12) United States Patent
He (10) Patent No.: US 8,561,319 B2
(45) Date of Patent: Oct. 22, 2013

(54) INDUSTRIAL AUTOMATIC PRODUCTION METHOD FOR SLUDGE DEWATERING INTO A DRY SLUDGE POWDER AND EQUIPMENT THEREOF

(76) Inventor: Yongfeng He, Shenzhen (CN)

( * ) Notice: Subject to any disclaimer, the term of this patent is extended or adjusted under 35 U.S.C. 154(b) by 124 days.

(21) Appl. No.: 12/990,397

(22) PCT Filed: Apr. 17, 2009

(86) PCT No.: PCT/CN2009/000412
§ 371 (c)(1),
(2), (4) Date: Jul. 20, 2011

(87) PCT Pub. No.: WO2009/132511
PCT Pub. Date: Nov. 5, 2009

(65) Prior Publication Data
US 2011/0271549 A1 Nov. 10, 2011

(30) Foreign Application Priority Data
Apr. 29, 2008 (CN) .......................... 2008 1 0094389

(51) Int. Cl.
*F26B 3/00* (2006.01)
(52) U.S. Cl.
USPC .............. 34/480; 34/60; 34/79; 34/82; 34/95; 34/189; 34/236; 34/524; 34/526
(58) Field of Classification Search
USPC ........... 34/60, 79, 82, 95, 189, 236, 524, 526, 34/480
See application file for complete search history.

(56) References Cited

U.S. PATENT DOCUMENTS

| | | | |
|---|---|---|---|
| 4,040,190 A * | 8/1977 | van den Broek | 34/379 |
| 4,761,893 A * | 8/1988 | Glorioso | 34/379 |
| 4,989,344 A | 2/1991 | Glorioso | |
| 6,357,577 B1 * | 3/2002 | Bruke | 198/625 |
| 7,083,728 B2 * | 8/2006 | Logan et al. | 210/609 |

FOREIGN PATENT DOCUMENTS

CN 100998958 7/2007

\* cited by examiner

*Primary Examiner* — Kenneth Rinehart
*Assistant Examiner* — Gajanan Prabhu
(74) *Attorney, Agent, or Firm* — Jack Schwartz & Associates, PLLC (57) ABSTRACT

The present invention involves to the industrial automated producing method for dewatering the sludge into the dry sludge powder and the assembly thereof. The present method is to realize the industrial automated production in the industrial automated producing assembly, especially in the main equipment, dehydrator, for dewatering the sludge into the dry sludge powder, so as to dewater the sludge having the moisture content below 85% into the dry powder having the moisture content below 5%. The method and assembly of the present invention realizes recycling, reducing, stabilizing, and reusing the sludge, and can be widely applied for dewatering process of the domestic, industrial or riverway sludge or sediment.

3 Claims, 7 Drawing Sheets

FIG. 7-2      FIG. 7-1

INDUSTRIAL AUTOMATIC PRODUCTION METHOD FOR SLUDGE DEWATERING INTO A DRY SLUDGE POWDER AND EQUIPMENT THEREOF

CROSS-REFERENCE TO RELATED APPLICATIONS

This application claims priority to Chinese patent application no. 200810094389.5, filed on Apr. 29, 2008, titled, Industrial Automatic Production Method For Sludge Dewatering Into Dry Sludge Powder and Equipment Thereof which is incorporated herein by reference in its entirety.

BACKGROUND

Technology Field

The present invention involves environmental protection project areas, especially involving an industrial automated production method for dewatering sludge having the weight of the moisture content below 85% into dry powder having the weight of the moisture content below 5% and assembly thereof.

At present, the methods for processing the industry and domestic sewage and sludge or the sludge (activity) which the sewage had been treated mainly adopt the natural drying method, the mechanical dewatering method, the rotary kiln method, the multilayer furnace method, the fluidized bed combustion method, and the aerobic digestion and the anaerobic digestion method, etc., internationally. These methods have many shortcomings, such as, the low processing rate, imperfect techniques, single technology, the lagged equipment; the low disposal and guarantee rate, the high risk of the secondary pollution; the high investment risk and low benefit even relying on subsidies; no recycling for the processed sludge, and not rational using all of resources, etc. Even more, some of the sludge treatment factory was studded or suffused with the sludge, which has a strong odor, cannot be processed to meet the requirement of standard, and is land filled, so as to harm the environment and endanger humans.

At present, it has no report that the automated production method for dewatering the sludge having the weight of the moisture content below 85% into the dry sludge powder having the weight of water content below 5% can be achieved with the low occupation of land, less investment, low cost, and fully realization of hazard-free treatment, reduction, stabilization, and reclamation, without secondary pollution, small footprint, heating, and adding the chemicals.

SUMMARY

One object of the present invention is to overcome the said drawbacks of the prior art, and provide an industrial automated production method of dewatering the sludge having the weight of the moisture content below sludge into the dry powder having the weight of the moisture content below 5% with realization of hazard-free treatment, reduction, stabilization and reclamation, and the assembly thereof with the inventor's long-term practice on the development and researching of the sewage treatment and industrialisation production. The industrial automated production method for dewatering sludge into sludge dry powder according to the present invention is characterized in that the said method includes the following steps:

(1) In the assembly for dewatering the sludge into sludge dry powder, the sludge (stored in sludge silo 1) is transported to the dry and wet mixer 3 via the screw conveyor 2, while feeding a small amount of dry mud powder in the dry powder intermediate storage 11 to the dry and wet mixer 3 by the screw conveyor 12 to mix with the sludge uniformly, and the obtained mixer is transported to the intermediate storage 5 by the elevator 4, followed by being fed to the sludge dehydrator 7 via a screw conveyor 6 to be dewatered into the dry sludge powder in the dehydrator 7, which is fed into the collector 8-1 together with the air inhaled during the operation of the sludge dehydrator 7 for gas-powder separating, wherein the isolated minute powder is fed to a vertical spiral conveyor 10 through screw conveyor 9 followed by being fed into the dry mud powder intermediate storage 11, and the isolated moist air mixed with a small amount of powder is automatically fed to the secondary collector 8-2 through the pipelines so as to perform the second gas-powder separation, wherein the isolated powder is fed to the vertical spiral conveyor 10 through the screw conveyor 9, followed by being fed into the dry mud powder intermediate storage 11, and the isolated moist air mixed with the micro powder is automatically fed to the tertiary collector 8-3 through the pipelines so as to perform the third gas-powder separation, wherein the isolated micro powder is fed to the vertical spiral conveyor 10 through the screw conveyor 9 followed by being fed into the dry mud powder intermediate storage 11, and the isolated air is fed to the dust separation room 16 for dusting, wherein the purified air is vented into the air purifying room 17 via the exhausting pipe so as to be wet purified and discharged; and (2) the dry mud powder in the dry mud powder intermediate storage 11 is fed into the dry powder packaging storage 15 through the screw conveyor 14 as so to be packaged for sale or further be processed into the efficient desulfurizing agent, powder fuel, and high efficient multi-fertilizer, and so on (as shown in the FIG. 1), in addition to be fed to the dry-wet mixer 3 through the screw conveyor 12, in part.

Figure 1:
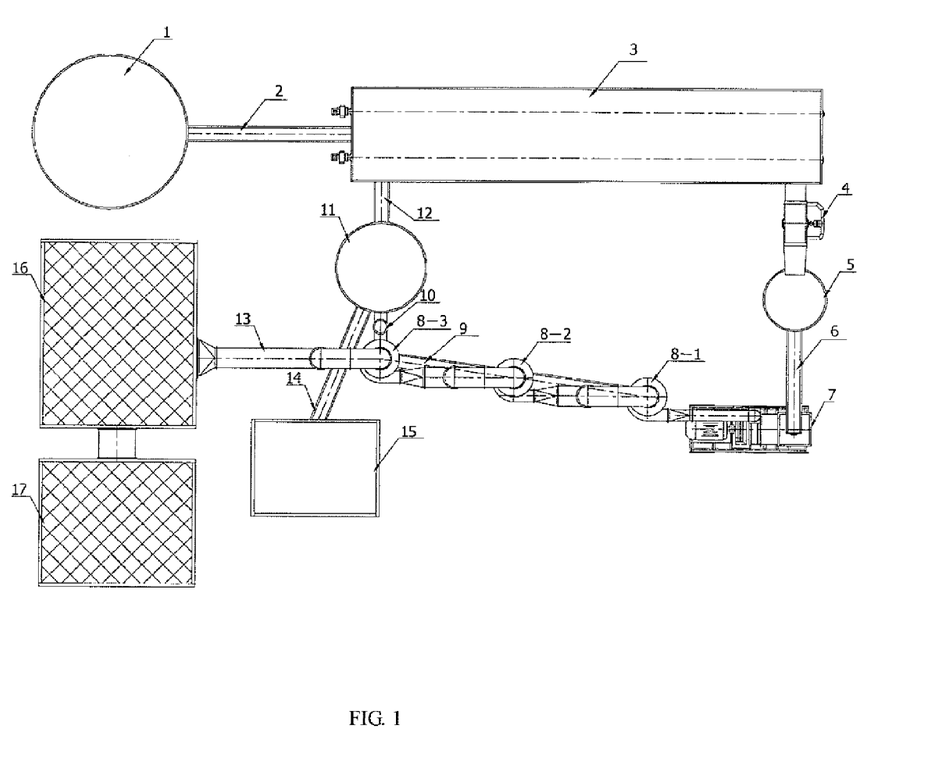
FIG. 1 is the flow chart of the industrial automatic producing method for dewatering the sludge having the moisture content below 85% into the dry sludge powder having the moisture content below 5%.

The industrial automated production assembly for dewatering sludge into sludge dry powder according to the present invention, is characterized of including the sludge silo 1, the screw conveyor 2, the dry and wet mixer 3, wherein the said screw conveyor 2 is located between the sludge silo 1 and the dry wet mixer 3 and automatically feeds the sludge to the dry wet mixer;

the elevator 4, the intermediate storage 5, the screw conveyor 6, and the sludge dehydrator 7 which are arranged on the downstream of the dry and wet mixer in order, wherein the elevator 4 is located between the dry and wet mixer and intermediate storage and feeds the mixer to the intermediate storage, and the screw conveyor 6 is fixed between the intermediate storage and the sludge dehydrator and feeds the mixer to the sludge dehydrator to be dewatered into the dry sludge powder;

the collectors 8-1, 8-2, and 8-3, the screw conveyer 9, the vertical screw conveyer 10, the dry mud powder intermediate storage 11, wherein the said collectors are arranged on the downstream of the dehydrator and the upstream of the vertical spiral conveyor in order, for gas-mud separating the dehydrated dry sludge powder respectively or in turn, wherein the separated dry sludge powder is transported to dry sludge intermediate storage, and the screw conveyer 9 is arranged between the collector and the vertical spiral conveyor 10;

the screw conveyor 12, fixed between the dry mud powder intermediate storage and the dry and wet mixer, for feeding the part of the dry mud powder into the wet and dry mixer;

the screw conveyor 14 fixed between the dry sludge intermediate storage and the packaging storage, the dry powder packaging storage 15;

the exhausting pipe 13, the dust separation room 16, and air purifying room 17, which are arranged on the downstream of the collectors in order, wherein the dust separation room is between the downstream of the exhausting pipe and the upstream of the air purifying room, and the gas-powder separated moist air in the collectors is fed to the dust separation room for purifying followed by being exhausted;

the computer automatic control system (not shown), for controlling the automated industrial production of the whole assembly, so as to implement the automatic production (see FIG. 1).

In accordance with the industrial automated production assembly for dewatering sludge into sludge dry powder of the present invention, the said sludge dehydrator may be in levels from 1 to 3 depending on requirement of the raw material.

Figure 2:
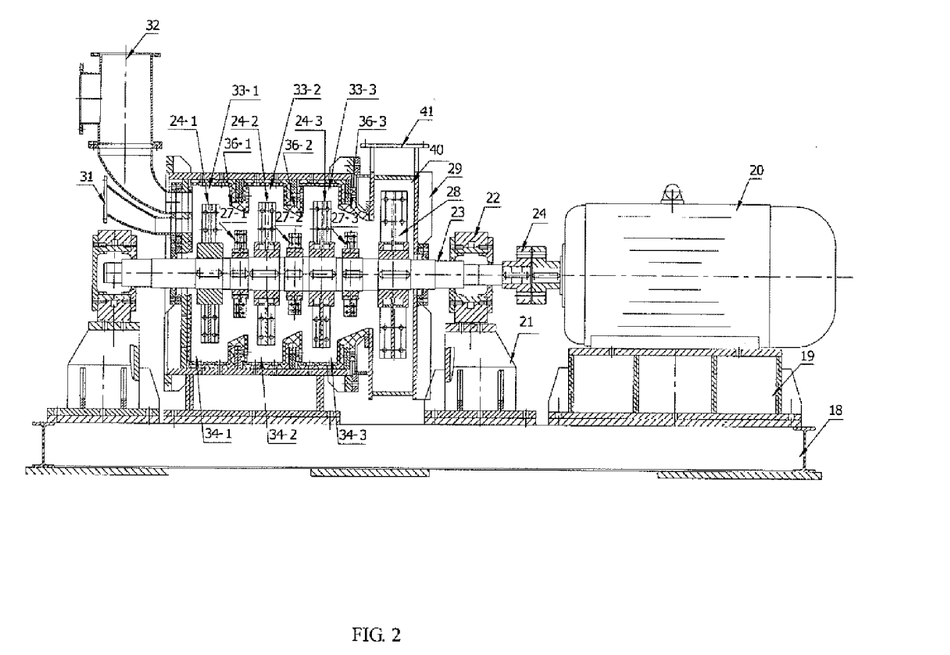
FIG. 2 is the structural drawing of the dehydrator in three levels.
Figure 3:
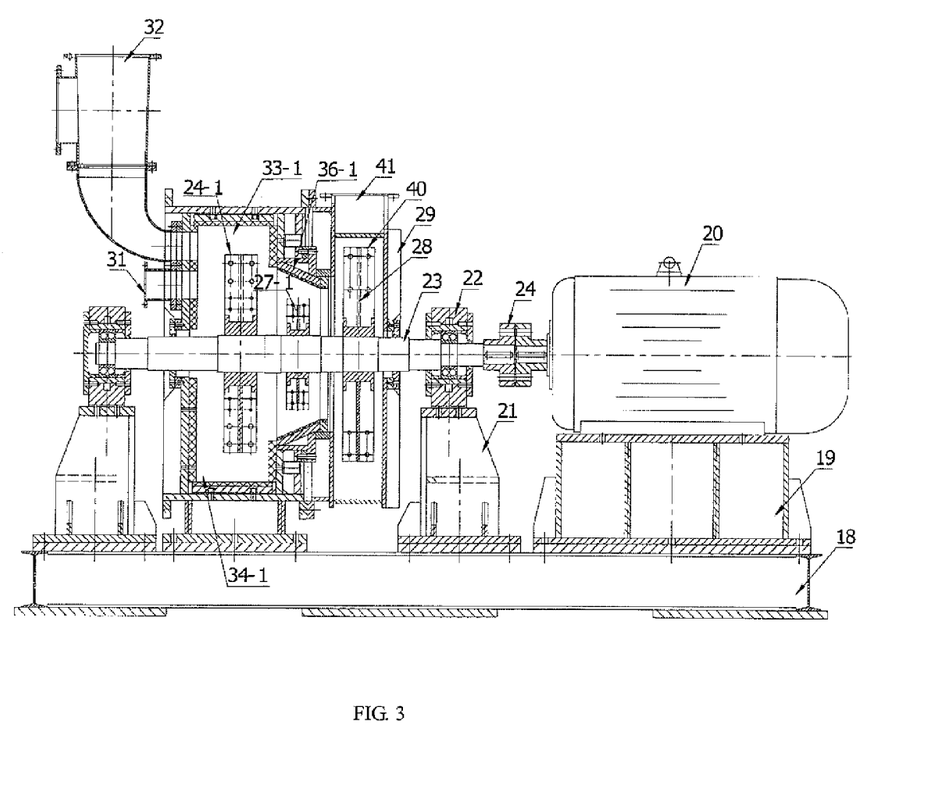
FIG. 3 is the structural drawing of the dehydrator in one level.
Figure 41:
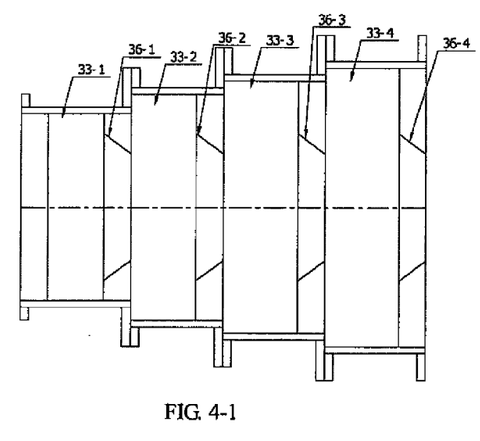
Figure 42:
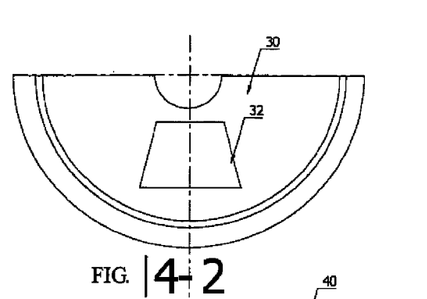
Figure 43:
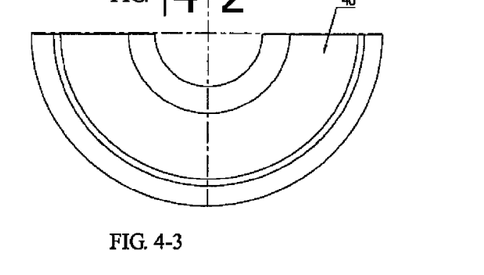
Figure 51:
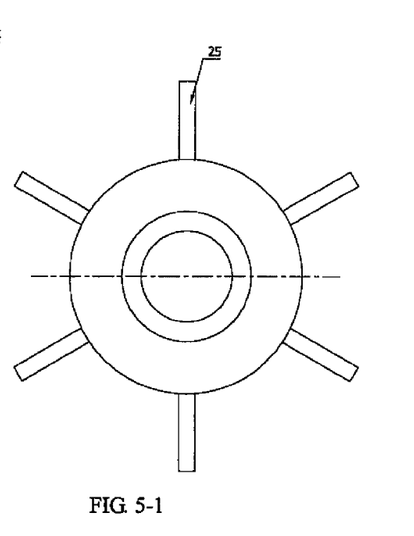
Figures 52, 53:
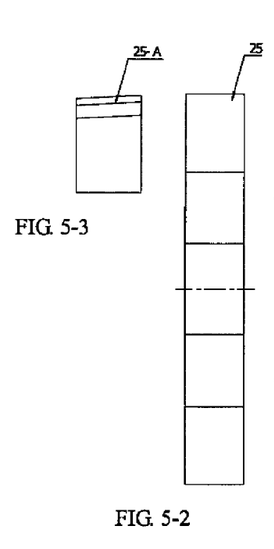
Figures 61, 63:
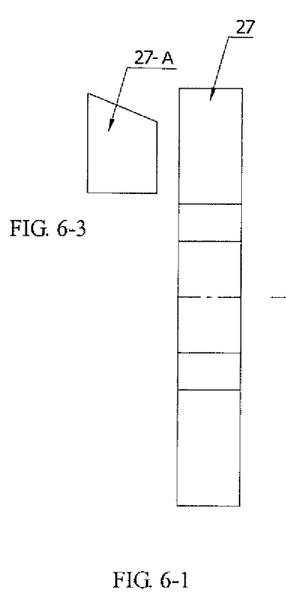
Figure 62:
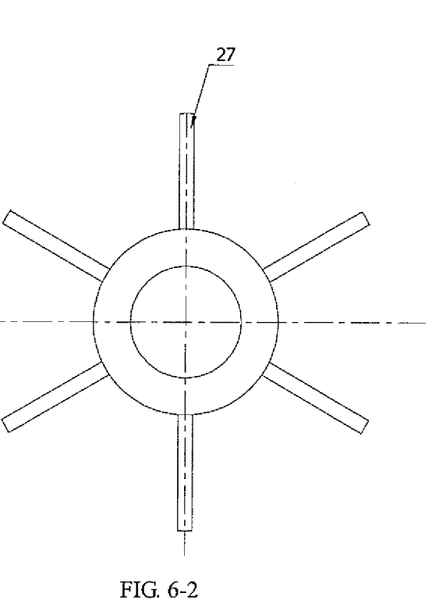
Figure 71:
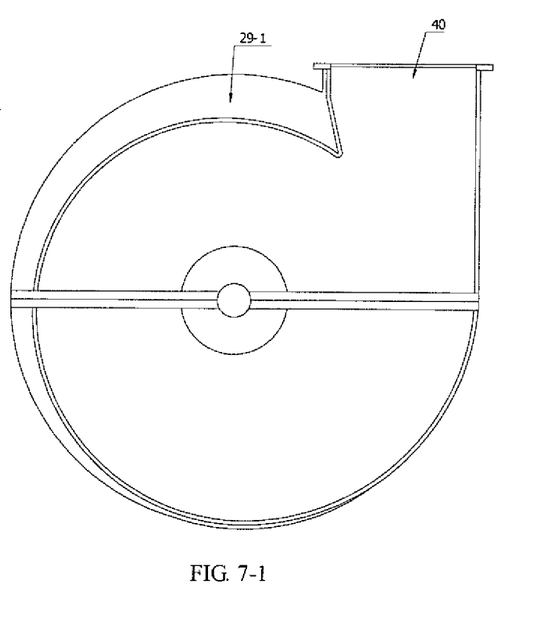
Figure 72:
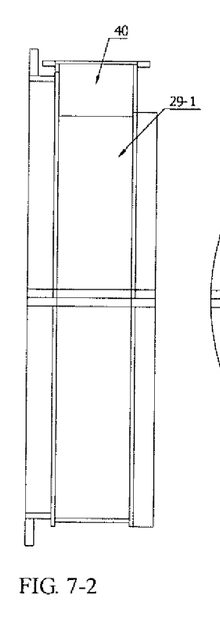
Figure 81:
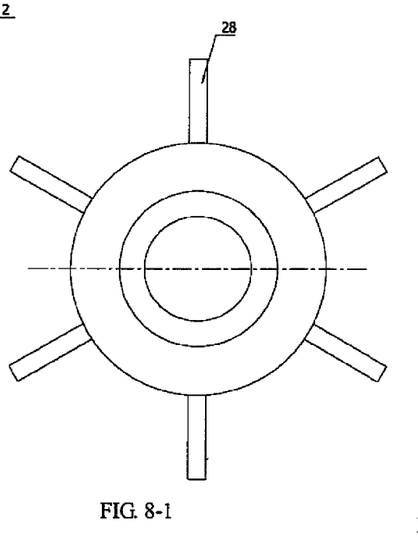
Figures 82, 83:
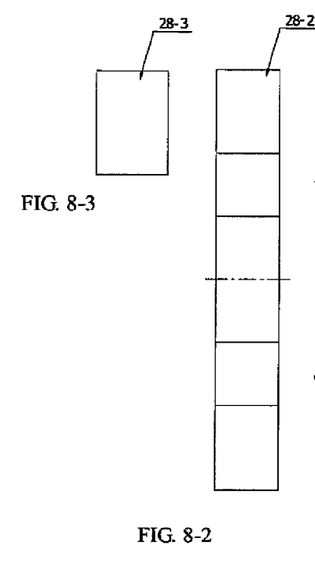
Figure 84:
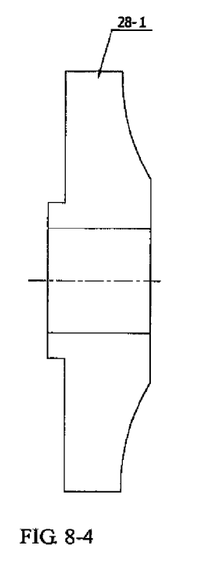

The said sludge dehydrator in levels 1 to 3 (see FIGS. 2 and 3) is characterized of including the mount 18, the motor bracket 19 fixed on the mount for the discharging outlet, equipped with the motor in connection with the power supply through the switch (not shown), the motor 20, the two bearing housings support 21 fixed on the mount for the feeding inlet and the mount between the shell of the impeller and the motor bracket, respectively, two bearing housings 22 installed on the two bearing housings bracket, the main bearing 23, installed on the bearing mount 22, and in connection with the motor 20 by the coupling 24 to form the start-up and transmission system;

the dehydrating wheels 25 consisting of the dehydrating wheels 24-1, 24-2, and 24-3, having the decreasing diameters in order, evenly distributed with three to twelve impellers having the detachable Hammer 25-A at each end, which can be detached easily upon wearing (as shown in the FIGS. 5-1, 5-2, and 5-3); the regulating wheels 27-1, 27-2, and 27-3, each having the increasing diameter in order, and uniformly distributed with the three to twelve impellers equipped with the detachable regulating plate 7-A on its end which may be detached and adjust the amount of blowback air, the fineness of the product, and the output (referring to the FIGS. 6-1, 6-2, and 6-3), wherein the dehydrating wheel and regulating wheel are installed on the main bearing within the dehydrating room of the dehydrating shell, and the individual regulation wheel is fixed at the outlet of the dehydrating wheel;

the dehydrating shell, including the circular, square or octagonal dehydrating room consisting of the up-dehydrating rooms 33-1, 33-2, and 33-3 having the increasing capacity in order, and the down-dehydrating rooms 34-1, 34-2, and 34-3 having the increasing capacity in order, in opposite position, wherein the part of the shell opposite to the regulating wheels 27-1, 27-2, and 27-3 forms the cones 36-1, 36-2, and 36-3 having the increasing capacity in order, and the impeller shell 29 opposite to the regulating wheel, resulting in the dehydrating area of the sludge dehydrators in levels 1 to 3, wherein each includes the corresponding dehydrating wheel (24-1), and the up- and down-dehydrating rooms 33-1 and 34-1), the regulating wheel 27-1 and the Cone 36-1;

the impeller 28, installed in the impeller shell on the main axis at the exit of the regulating wheel 27-3, which may be the Plate impeller 28-2 or the inner sucking type impeller 28-1, wherein the Plate impeller 28-2 is mounted with the plate impeller regulation board 28-3 for regulation the air quantity and air pressure and ensuring the materials smooth on its end (as shown in the FIG. 8);

the impeller shell 29, in a spiral shape, and formed with the impeller room 29-1 in its interior, having the material fed in the axial direction, and discharged from the outlet in the radial direction (as shown in the FIG. 7);

the feeding port 32 and the air inlet 31 which are fixed on the up-dehydrating room 30, the discharging outlet 40 which is mounted above the impeller shell, and installed with the controlling valve above it, the collectors 8-1, 8-2, and 8-3 with the discharge devices at their bottom respectively, and dust-cleaning room 16 with the air outlet and in connection with the collectors through pipeline, above it, wherein the collector 8-1 is connected with the air outlet through the pipeline, which is connected with the collector 8-2 through the blast pipe 20.

When a large number of air and material is sucking into the dehydrating room 33-1 through feeding port 32, the air swirl forms in the dehydrating room resulted from the operation of the dehydrating wheel 25-1 with high speed, and the material is engulfed into the swirl instantaneously to self-collide irregularly due to the differences in the grain diameter, the micro-cracks, the density, the specific gravity, the viscosity, and the hardness for the material, so that the mixture of the cracked material and the water and air which are collided out when colliding flows to the cone 36-1 arranged beside the dehydrating rooms 33-1 and 34-1, and mounted with the regulating wheel 27-1 which forms the blow back air when running to push back the coarse materials and wet materials for re-dehydrating and passing the powder and a large amount of air into of the secondary dehydrating rooms 33-2, and 34-2 and the secondary cone 36-2, followed by entering into the tertiary dehydrating rooms 33-3 and 34-3 and the tertiary cone 36-3. And, for the dehydrating room, the dehydrating wheel, and the regulating wheel in levels 1 to 3, the bigger their sizes are, the higher the linear velocities for the air and the material operating are, and the finer the discharged material is, while the water molecule balls are also smashed to realizing a full contact with the air so as to constitute a complete dehydrating systems and grading system. Therefore, the obtained fine powder separated after dehydrating for three times, and the air carrying with lot of moisture flows into the impeller spiral shell with the impellers to automatically discharge the fine powder and the moist air out of the sludge dehydrator through the discharging outlet 40 installed with the controlling valve 41 to adjust the quantity and pressure of the air, and control the yield and moisture content in combined with the regulating plate on the regulating wheel. The moist air and material in the discharging outlet 40 are connected with the collector 8-1 through the pipeline, followed by being connected with the collector 8-2 through the blast pipe, wherein the collectors 8-1 and 8-2 are installed with the draught fan on their bottom respectively. The material and the moist air are completely separated each other by collecting and separating for a second times, so that the moist air flows in the dust-cleaning room 16, and the material and duct obtained by the secondary collection flow into the silo. And, in the case of no strict requirement with the moisture content of the powder, the dehydrating may be performed in one or two levels dehydrating, not in the three levels as the above described, that is, reducing one or two dehydrating rooms, cones, the dehydrating wheels, the regulating wheel, and the number of times of dehydration (referring to the sludge dehydrator in 3 levels-dehydrating as shown in the FIG. 2, and the sludge dehydrator in one level dehydrating as shown in the FIG. 3).

In accordance with the industrial automatically producing method for dewatering the sludge having the moisture content below 85% into sludge dry powder having the moisture content below 5% of the present invention, the said e main equipment, the sludge dehydrator, realizes industrial automation. And, the technical steps and parameters closely match with the sludge dehydrator, which is realized for industrial automation by the computer control system in the main equipment, the sludge dehydrator.

The said sludge refers to a variety of the domestic sludge or sediment, the industrial sludge or sediment, or the disposed sludge, the sludge or sediment of the lake, pond, river way, unlimited to the state, region, the chemical composition of the sludge or the sediment of chemical composition, with the physical properties in the scope of dehydration. Or, the material similar to the above may be in the scope of dehydration.

The ratio for mixing the sludge and the dry powder depends on the moisture content of the sludge, for the sludge having the moisture content lower than or equal to 65% with no addition of the dry powder, and for the sludge having the moisture content equal to or more than 65%, such as from 65% to 85% with addition of the dry powder the ratio of 0.01 to 1 times to the sludge in weight.

The said dewatering the mixture into the dry sludge powder, drying for phase change, in the said main equipment, the sludge dehydrator, refers to the processes of breaking the molecule globe of the sludge and the water into pieces to change the surface tension of the sludge and water by crushing, while instantaneously binding the water molecule with the large amount of air relying on the sludge dehydrator inhaling so as to be discharged together, followed by the gas-dust separating in the collector to realizing drying the sludge, based on the property of the sludge as the swelling pseudo-colloid. The industrial automatically producing method and assembly thereof for dewatering the sludge having the moist content below 85% into the dry sludge powder having the moist content below 5% provided by the present invention are advanced of;

(1) producing without secondary pollution as a result of fully closing during the whole producing process without waste water, waste gas, and waste sludge;

(2) the product, the dried sludge powder, having the good quality and wide use that the product having the moisture content below 5%, 2.95% to 4.55% as measured, can be applied to produce the high effective desulfurizer, the powder fuel, the high efficient composite fertilizer and extract various useful component or the building materials, etc.;

(3) the extensive source, high quantity, long-term application for the raw material sine the raw material in a increasingly amazing large amount in the world can be applicable without limit in the chemical composition and physical properties of the sludge or the sediment for the method of the present invention, so that the method of the present invention can be applied for a long time;

(4) the convenience and saving as a result of no addition of chemical agents, no heating, the short process and less equipment;

(5) the good capability in automated controlling and less operating worker resulted from the realization of full automatic controlling in the workshop;

(6) the less floor space reduced more than 80% and the investment reduced more than in case of the same scale;

(7) savings in the land and energy compared with the incinerating method and landfilling method;

(8) realization of recycling, reducing, stabilizing, and reusing the sludge or the sediment to meet the developing standards of the cyclic economy.

BRIEF DESCRIPTION OF THE DRAWINGS

FIGS. 4-1, 4-2, and 4-3 are the structural drawings of the dehydrating room and the cone of the dehydrator.

FIGS. 5-1, 5-2, and 5-3 are the structural drawings of the dehydrating wheel of the dehydrator.

FIGS. 6-1, 6-2, and 6-3 are the structural drawings of the regulating wheel of the dehydrator.

FIGS. 7-1 and 7-2 are the structural drawings of the impellers shell of the dehydrator.

FIGS. 8-1, 8-2, 8-3, and 8-4 are the structural drawings of the impellers of the dehydrator.

DESCRIPTION OF THE PREFERRED EMBODIMENT

It can be understood for the person skilled in the art that the examples as below if provided in the objection of explaining and illuminating the present invention with no any limit to the scope of the present invention.

Examples 1 to 5

The example 1 is for the domestic sludge having the moisture content of 65; the example 2 is for the industrial sediments having moisture content of 65%; the example 3 is for the domestic sludge having the moisture content of 85%, the example 4 is for the domestic sludge having the moisture content of 70%; and the example 5 is for the industrial sediment having the moisture content of 85%. The examples 1 to 5 are performed with the industrial automated production method and assembly for dewatering the sludge into the dry sludge powder, and the results are shown in the table 1.

TABLE 1

| Item | Example 1 | Example 2 | Example 3 | Example 4 | Example 5 |
| --- | --- | --- | --- | --- | --- |
| The moisture content of the raw material | 65 | 65 | 85 | 70 | 85 |
| The ratio for adding the dry powder in weight | 0 | 0 | 1 | 0.1 | 0.8 |
| The moisture content of the product | 4.55 | 4.01 | 4.75 | 4.52 | 4.22 |

The invention claimed is:

1. An industrial automated producing method for dewatering sludge into dry sludge powder including the following steps:

(1) In a device of dewatering the sludge into the dry sludge powder, the sludge in a sludge silo (1) is transported to a dry and wet mixer (3) by a screw conveyor (2), while transporting a small amount of dry mud powder in a dry powder intermediate storage (11) to the dry and wet mixer (3) through a screw conveyor (12) to mix uniformly, followed by feeding the mixture to an intermediate storage (5) by an elevator (4), then to a sludge dehydrator (7) via a screw conveyor (6) so as to dewater the mixture into the dry sludge powder, said sludge dehydrator (7) including an air-inlet port and one or more sludge dehydrating sections, each of said sludge dehydrating sections comprising a dehydration wheel (24) for dehydrating the sludge through its high speed rotation into isolated dry sludge powder, the high speed rotation simultaneously causes air to be inhaled into the one or more dehydrating sections via the air-inlet port, breaks the mixture by crushing and binds water molecules from the mixture with the inhaled air to form isolated moist air, the dehydration of the sludge occurring without directly heating the sludge, each sludge dehydrating section further including a regulating wheel (27) for pushing back coarse and wet materials in the mixture for re-dehydrating in one of the dehydration sections and passing the isolated dry sludge powder and a large amount of isolated moist air, feeding the isolated dry sludge powder into a collector (8-1) together with the air inhaled during the operation of the sludge dehydrator (7) to perform gas-powder separation, wherein the dry sludge powder is fed to a vertical spiral conveyor (10) through a screw conveyor (9), followed by being fed into the dry mud powder intermediate storage (11), feeding the isolated moist air mixed with a small amount of isolated dry sludge powder from the collector (8-1) to a secondary collector (8-2) through pipelines so as to perform the second gas-powder separation, wherein the isolated dry sludge powder is fed to the vertical spiral conveyor (10) through the screw conveyor (9) followed by being fed into the dry mud powder intermediate storage (11), feeding the isolated moist air mixed with the isolated dry sludge powder from the secondary collector (8-2) to a tertiary collector (8-3) through pipelines so as to perform the third gas-powder separation, wherein the isolated dry sludge powder from the tertiary collector (8-3) is fed to the vertical spiral conveyor (10) through the screw conveyor (9) followed by being fed into the dry mud powder intermediate storage (11), and the isolated moist air is fed to a dust separation room (16) for dusting to obtain purified air which is vented into an air purifying room (17) via an exhaust pipe for wet purification and discharged; and (2) feeding the isolated dry sludge powder in the dry mud powder intermediate storage (11) to a dry powder packaging storage (15) via a screw conveyor (14), in addition to feeding the isolated dry sludge powder to the dry and wet mixer (3) via the screw conveyor (12) into the dry and wet mixer (3).

2. An industrial automated production assembly for dewatering sludge into dry sludge powder, is characterized in that the said assembly includes a sludge silo (1), a dry and wet mixer (3), a screw conveyor (2) which is located between the sludge silo (1) and the dry and wet mixer (3);

an elevator (4), an intermediate storage (5), a screw conveyor (6), and at least one sludge dehydrator (7) which are arranged on the downstream of the dry and wet mixer in order, wherein the elevator is fixed between the dry and wet mixer and intermediate storage, and the screw conveyor (6) sets between the intermediate storage and the at least one sludge dehydrator, said at least one sludge dehydrator (7) comprising a dehydration wheel (24) for dehydrating the sludge through its high speed rotation into isolated dry sludge powder, the high speed rotation simultaneously causes air to be inhaled into the one or more dehydrating sections via the air-inlet port, breaks the mixture by crushing and binds water molecules from the mixture with the inhaled air to form isolated moist air, the dehydration of the sludge occurring without directly heating the sludge;

collectors (8-1), (8-2), and (8-3), a screw conveyor (9), a vertical spiral conveyor (10), and a dry mud powder intermediate storage (11), wherein the collectors are arranged on the downstream of the at least one sludge dehydrator connected to one another in order through pipelines, and on the upstream of the vertical spiral conveyor, the screw conveyor (9) is set between the collectors and the vertical spiral conveyor (10), and the screw conveyor (12) is located between the dry mud powder intermediate storage and the dry and wet mixer;

a screw conveyor (14), a dry powder packaging storage (15), wherein the screw conveyor (14) is fixed between the dry mud intermediate storage and the dry powder packaging storage;

an exhaust pipe (13), a dust separation room (16), and an air purifying room (17), which are arranged on the downstream of the collector in order, wherein the dust separation room (16) is set on the downstream of the exhausting pipe and on the upstream of the air purifying room; and assembly is automatically controlled by a computer.

3. The industrial automated production assembly for dewatering sludge into dry sludge powder according to the claim 2, is characterized in that the said at least one sludge dehydrator includes:

a mount (18), a motor bracket (19), a motor (20), two bearing housing brackets (21), two bearing housings (22), wherein the motor bracket is fixed on the mount for a discharging outlet (40), and equipped with the motor connected with a power by a switch, the two bearing housing brackets are installed on the mount for the feeding inlet (32) and the mount between the shell of an impeller and the motor bracket respectively, and the two bearing housings are mounted on the two bearing housing brackets;

a main bearing (23) having two ends fixed on the bearing mount (22), and connected with the motor (20) by a coupling (24) to form a start-up and transmission system;

dehydrating wheels (24-1), (24-2), and (24-3) having the diameter increasing in order, and evenly distributed with three to twelve impellers, each having a detachable Hammer (25A) at its end, regulating wheels (27-1), (27-2), and (27-3) having the diameter increasing in order, and uniformly distributed with three to twelve impellers, each having a detachable regulating plate (27-A), wherein the dehydrating wheels and regulating wheels are installed on the main bearing within the dehydrating room of the dehydrating shell, and the individual regulation wheel is close to the outlet of the dehydrating wheel;

a dehydrating shell including a dehydration room which is round, square or octagonal in shape, and formed by up-dehydration rooms (33-1), (33-2), and (33-3), and down-dehydration rooms (34-1), (34-2), and (34-3) in the opposite position to each other, wherein the part of the dehydrating shell opposite to the regulating Wheels (27-1), (27-2), and (27-3) forms cones (36-1), (36-2), and (36-3) and an impeller shell (29) opposite to the regulating wheel, resulting in the dehydration area of the at least one sludge dehydrator in levels 1 to 3, each having the corresponding dehydrating wheel, the up- and down-dehydration rooms, the regulating wheel and the cone;

impeller (28) mounted in the impeller shell on a main axis of the bearing (23) at the exit of the regulating Wheel (27-3), and impeller shell (29) in a spiral shape with a impeller room (29-1) in its interior, wherein the said impeller may be Plate impeller (28-2) mounted with the plate impeller regulation board (28-3) at its end or the inner sucking type impeller (28-1), and the material is fed in the axial direction, and discharged from the discharging outlet in the radial direction;

and the feeding inlet (32) and an air inlet (31) which are fixed on up-dehydration room (36), the discharging outlet (40) which is mounted above the impeller shell and installed with the control valve (41) on its above, the collectors (8-1), (8-2), and (8-3), and the dust-cleaning room (16), wherein the collector (8-1) is connected with the air outlet through a pipeline, and the air outlet is connected with the collector (8-2) through an air pipe, discharge devices are set at the bottom of the collectors (8-1) and (8-2) respectively, and the dust-cleaning room is connected with the collectors through a pipeline and fixed with the air outlet.

\* \* \* \* \*